United States Patent
Bley et al.

(10) Patent No.: US 7,496,896 B2
(45) Date of Patent: Feb. 24, 2009

(54) ACCESSING RETURN VALUES AND EXCEPTIONS

(75) Inventors: John B. Bley, San Mateo, CA (US); Daryl L. Puryear, San Mateo, CA (US)

(73) Assignee: Computer Associates Think, Inc., Islandia, NY (US)

( * ) Notice: Subject to any disclaimer, the term of this patent is extended or adjusted under 35 U.S.C. 154(b) by 815 days.

(21) Appl. No.: 10/622,022

(22) Filed: Jul. 17, 2003

(65) Prior Publication Data

US 2005/0015750 A1 Jan. 20, 2005

(51) Int. Cl.
G06F 9/44 (2006.01)

(52) U.S. Cl. .................. 717/127; 717/106; 712/228; 712/244

(58) Field of Classification Search ............ 717/130, 717/106, 127; 712/228, 244
See application file for complete search history.

(56) References Cited

U.S. PATENT DOCUMENTS

| | | | |
|---|---|---|---|
| 5,193,180 A * | 3/1993 | Hastings .................... | 717/163 |
| 5,423,042 A * | 6/1995 | Jalili et al. ................. | 719/328 |
| 5,583,988 A * | 12/1996 | Crank et al. ................. | 714/48 |
| 5,628,016 A * | 5/1997 | Kukol ........................ | 717/140 |
| 5,655,081 A | 8/1997 | Bonnell et al. | |
| 5,898,873 A | 4/1999 | Lehr | |
| 5,978,594 A | 11/1999 | Bonnell et al. | |
| 6,067,641 A * | 5/2000 | McInerney et al. ........... | 714/38 |
| 6,131,187 A * | 10/2000 | Chow et al. ................. | 717/106 |
| 6,289,446 B1 * | 9/2001 | Nilsson ....................... | 712/244 |
| 6,332,212 B1 | 12/2001 | Organ et al. | |
| 6,477,702 B1 * | 11/2002 | Yellin et al. ................. | 717/126 |
| 6,728,955 B1 * | 4/2004 | Berry et al. ................. | 717/158 |
| 6,760,903 B1 * | 7/2004 | Morshed et al. ............. | 717/130 |
| 6,901,588 B1 * | 5/2005 | Krapf et al. ................. | 717/164 |
| 6,904,517 B2 * | 6/2005 | Nevill et al. ................ | 712/228 |
| 6,934,832 B1 * | 8/2005 | Van Dyke et al. ........... | 712/244 |
| 7,065,633 B1 * | 6/2006 | Yates et al. .................. | 712/227 |
| 7,080,366 B2 * | 7/2006 | Kramskoy et al. .......... | 717/148 |
| 2002/0112227 A1 * | 8/2002 | Kramskoy et al. .......... | 717/148 |
| 2004/0250175 A1 * | 12/2004 | Draine et al. ................ | 714/46 |

* cited by examiner

*Primary Examiner*—Wei Y Zhen
*Assistant Examiner*—Chih-Ching Chow
(74) *Attorney, Agent, or Firm*—Vierra Magen Marcus & DeNiro LLP

(57) ABSTRACT

One or more new methods are added to existing object code. The existing object code includes a first method that is capable of producing a result. New code is added to the first method. The new code provides the result to one or more of the new methods. After the modification, the result (e.g. a return value or exception) from the first method can be accessed and used by other threads, processes, systems, entities etc. that were not originally programmed to access the result or exception.

40 Claims, 4 Drawing Sheets

ACCESSING RETURN VALUES AND EXCEPTIONS

CROSS-REFERENCE TO RELATED APPLICATIONS

This Application is related to U.S. patent application Ser. No. 09/795,901, "Adding Functionality To Existing Code At Exits," filed on Feb. 28, 2001, incorporated herein by reference in its entirety.

BACKGROUND OF THE INVENTION

1. Field of the Invention

The present invention is directed to technology for adding functionality to existing code in order to access information.

2. Description of the Related Art

As the Internet's popularity grows, more businesses are establishing a presence on the Internet. These businesses typically set up web sites that run one or more web applications. One disadvantage of doing business on the Internet is that if the web site goes down, becomes unresponsive or otherwise is not properly serving customers, the business is losing potential sales and/or customers. Analogous issues exist with Intranets and Extranets. Thus, there is a need to monitor live web applications (including Intranets, Extranets, applications on the World Wide Web, and others) to make sure that they are running properly.

If an application crashes or is not working as expected, an inquiry may be made as to why that application crashes or is not working as expected. Examples of information that may be useful in such an inquiry include return values and exceptions. A return value is data provided from a given method upon exit from that method. For example, in the JAVA programming language the "return" statement is used to exit from the current method and proceed with the statement that follows the original method call. There are two forms of return: one returns a value and one doesn't. To return a value, the value or an expression that calculates the value is placed after the "return" keyword. (JAVA is a trademark of SUN Microsystems, Incorporated.)

An exception is an event that occurs during the execution of a program that disrupts the normal flow of instructions. Many kinds of errors can cause exceptions. They range from serious hardware errors, such as a hard disk crash, to simple programming errors, such as trying to access an out-of-bounds array element. When such an error occurs within a JAVA method, the method creates an exception object and hands it off to the run time system. The exception object contains the information about the error, including its type and, possibly, the state of the program when the error occurred. The run time system is then responsible for finding some code to handle the error. In JAVA terminology, creating an exception object and handing it to the run time system is called throwing an exception.

After a method throws an exception, the run time system attempts to find something to handle the exception. The set of possible "somethings" to handle the exception includes the, set of methods in the call stack of the method where the error occurred. The run time system searches backwards through the call stack, beginning with the method in which the error occurred, until it finds a method that contains an appropriate exception handler. An exception handler is considered appropriate if the type of exception thrown is the same type as (or a subclass of) the type of exception handled by the handler. The exception bubbles up through the call stack until an appropriate handler is found and one of the calling methods handles the exception. The exception handler chosen is said to catch the exception. If the run time system exhaustively searches all the methods in the call stack without finding an appropriate exception handler, the thread terminates. A method can catch an exception by providing an exception handler for that type of exception.

The first step in constructing an exception handler is to enclose the statements that might throw an exception within a "Try" block. Exception handlers are associated with a "Try" block by providing one or more "Catch" blocks directly after the "Try" block. Each "Catch" block is an exception handler and handles the type of exception indicated by its argument. Exception handling may optionally include a means for cleaning up before allowing control to be passed to a different part of the program. This can be done by enclosing the clean up code within a "Finally" block. The "Finally" block in the JAVA code provides a mechanism that allows a method to clean up after itself regardless of what happens within the "Try" block. Consider the following pseudocode as an example:

```
public foo( )
    {
    try  {
        [JAVA instructions]
        } catch (ExceptionType name) {
            [code for "Catch" block]
        } finally {
            [code for "Finally" block]
        }
    }
```

The method foo( ) is comprised of logic implemented by [JAVA instructions]. These [JAVA instructions] are enclosed in a "Try " block. If an exception of type ExceptionType occurs while performing the [JAVA instructions], then the "Catch " block is performed. Regardless of whether the method runs without error or there is an exception, the "Finally " block will be performed. The "Finally " block is performed after the "try " block and the "Catch " handler.

Accessing the exception or return value can be valuable for debugging. Thus, some programmers will add Try, Catch and Finally statements when creating their code to deal with and/or learn about the exceptions. Additionally, programmers can add code to report return values.

The process of adding code to report return values and exceptions can also be automated. For example, some performance analysis tools may perform their intended function by automatically modifying source code to add new functionality that enables the original software to be monitored. Modifying source code involves adding new instructions to source code and/or modifying existing instructions in the source code. A significant problem with modifying source code is that the source code may not be available. Another problem with modifying source code is that the code will need to be re-compiled for the modification and re-compiled again to remove the modification.

Thus, there is a need for an improved mechanism to provide for access to return values and exceptions when the source code did not originally provide for such access.

SUMMARY OF THE INVENTION

The present invention, roughly described, pertains to technology for accessing a return value, exception or other data when such access was not originally provided by the code.

In one embodiment, existing object code is accessed and modified. The existing object code includes a first method that is capable of producing a result. New code is added to the first method. The new code accesses the result and provides the result to another. After the modification, the result from the first method can be accessed and used by other threads, processes, systems, entities etc. that were not originally programmed to access the result. Examples of a result include a return value, an exception and a reference to an exception. In other embodiments, other items can also be a result value.

In some embodiments, the present invention includes a method that comprises the steps of storing a result for a first method from an operand stack, preparing the operand stack for an invocation of a second method, invoking the second method (including providing the result to the second method) and resetting the operand stack with respect to the result to a state existing prior to the step of storing the result.

The present invention can be accomplished using hardware, software, or a combination of both hardware and software. The software used for the present invention is stored on one or more processor readable storage devices including hard disk drives, CD-ROMs, DVDs, optical disks, floppy disks, tape drives, flash memory, RAM, ROM or other suitable storage devices. In alternative embodiments, some or all of the software can be replaced by dedicated hardware including custom integrated circuits, gate arrays, FPGAs, PLDs, and special purpose computers. In one embodiment, software implementing the present invention is used to program one or more processors. The processors can be in communication with one or more storage devices, and/or communication interfaces (e.g. modem, network card, keyboard, monitor, etc.).

These and other objects and advantages of the present invention will appear more clearly from the following description in which the preferred embodiment of the invention has been set forth in conjunction with the drawings.

DETAILED DESCRIPTION

One implementation of the present invention operates on JAVA code. For example purposes, the remaining portions of this document provide examples using JAVA code. However, the present invention applies to other programming languages and formats as well. Furthermore, the examples herein make use of the term "method, " which has a specific meaning in reference to the JAVA programming language. For purposes of this document, "method" includes a JAVA method as well as other sets of instructions such as procedures, functions, routines, subroutines, sequences, processes, etc.

The present invention provides technology for accessing a result (e.g., return value or exception) from a method, when such access was not originally programmed. Such access to the result is provided without requiring access to the source code. One embodiment of the present invention is used as part of an application performance C tool that monitors performance of an application. In one embodiment, the application performance analysis tool accomplish its task by modifying the application's object code (also called bytecode).

Object code can be generated by a compiler or an assembler. Alternatively, object code can be generated manually. Object code can be machine executable or suitable for processing to produce executable machine code. Modifying object code includes adding new instructions to the object code and/or modifying existing portions of the object code. Modifying object code typically does not involve accessing the source code. An example of modifying object code can be found in U.S. Pat. No. 6,260,187 "System For Modifying Object Oriented Code" by Lewis K. Cirne, incorporated herein by reference in its entirety.

Figure 1:
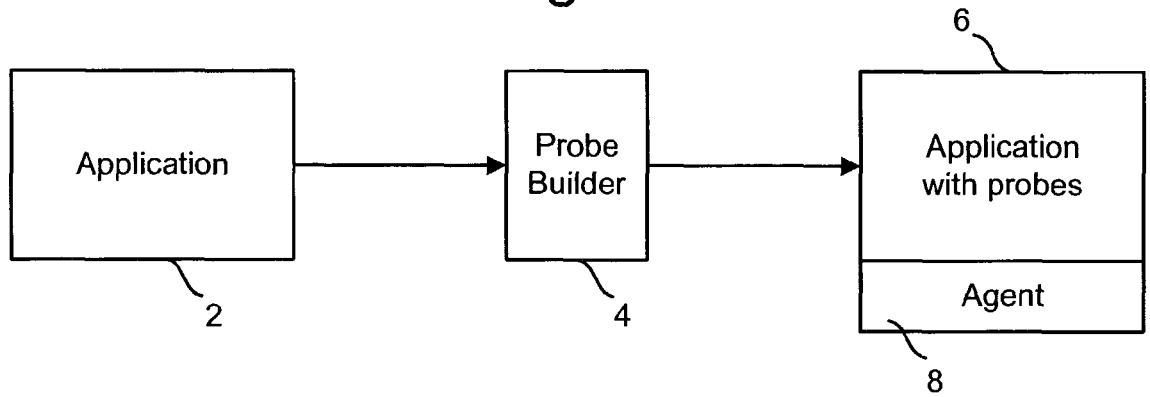
FIG. 1 is a block diagram depicting how byte code for an application can be modified.

FIG. 1 depicts an exemplar process for modifying an application's bytecode. FIG. 1 shows Application 2, Probe Builder 4, Application 6 and Agent 8. Application 6 includes probes, which will be discussed in more detail below. Application 2 is the JAVA application before the probes are added. In embodiments that use programming languages other than the JAVA programming language, Application 2 can be a different type of application.

Probe Builder 4 modifies the byte code for Application 2 to add probes and additional code to Application 2 in order to create Application 6. The probes measure specific pieces of information about the application without changing the application's business logic. Probe Builder 4 also installs Agent 8 on the same machine as Application 6. Once the probes have been installed in the bytecode, the JAVA application is referred to as a managed application.

One embodiment of an application performance analysis tool modifies object code by adding new code that activates a tracing mechanism (e.g. timers) when a method of concern starts and terminates the tracing mechanism when the method completes. In one implementation, new functionality is added to a method such that all or part of the new functionality is executed upon exit from the method. Rather than add many copies of the exit code in different places, the tool adds exit code using "Try" and "Finally" functionality. To better explain this concept consider the following example pseudo code for a method called "exampleMethod." This method receives an integer parameter, adds 1 to the integer parameter, and returns the sum:

```
public int
exampleMethod(int x)
{
    return x + 1;
}
```

One embodiment of a performance analysis tool will modify this code, conceptually, by including a call to a tracer method, grouping the original instructions from the method in a "Try" block and adding a "Finally" block with code that stops the tracer:

```
public int
exampleMethod(int x)
    {
    IMethodTracer tracer = AMethodTracer.loadTracer(
        "com.wily.introscope.agent.trace.MethodTimer",
        this,
        "com.wily.example.ExampleApp",
        "exampleMethod",
        "name=Example Stat");
    try {
        return x + 1;
        } finally    {
            tracer.finishTrace( );
            }
    }
```

IMethodTracer is an interface that defines a tracer for profiling. AMethodTracer is an abstract class that implements IMethodTracer. IMethodTracer includes the methods startTrace and finishTrace. AMethodTracer includes the methods startTrace, finishTrace, dostartTrace and dofinishTrace. The method startTrace is called to start a tracer, perform error handling and perform setup for starting the tracer. The actual tracer is started by the method doStartTrace, which is called by startTrace. The method finishTrace is called to stop the tracer and perform error handling. The method finishtrace calls doFinishTrace to actually stop the tracer. Within AMethodTracer, startTrace and finishTracer are final and void methods; and doStartTrace and doFinishTrace are protected, abstract and void methods. Thus, the methods doStartTrace and doFinishTrace must be implemented in subclasses of AMethodTracer. Each of the subclasses of AMethodTracer implement the actual tracers. The method loadTracer is a static method that calls startTrace and includes five parameters. The first parameter, "com.wily.introscope . . . " is the name of the class that is intended to be instantiated that implements the tracer. The second parameter, "this" is the object being traced. The third parameter "com.wily.example . . . " is the name of the class that the current instruction is inside of. The fourth parameter, "exampleMethod" is the name of the method the current instruction is inside of. The fifth parameter, "name= . . . " is the name to record the statistics under. The original instruction (return x+1) is placed inside a "Try" block. The code for stopping the tracer (a call to tracer.finishTrace) is put within the Finally block.

The above example shows source code being modified. In one embodiment, the present invention doesn't actually modify source code. Rather, the present invention modifies object code. The source code examples above are used for illustration to explain the concept of the present invention. The object code is modified conceptually in the same manner that source code modifications are explained above. That is, the object code is modified to add the functionality of the "Try" block and "Finally" block. More information about such object code modification can be found in U.S. patent application Ser. No. 09/795,901, "Adding Functionality To Existing Code At Exits," filed on Feb. 28, 2001, incorporated herein by reference in its entirety. In another embodiment, the source code can be modified as explained above.

Figure 2:
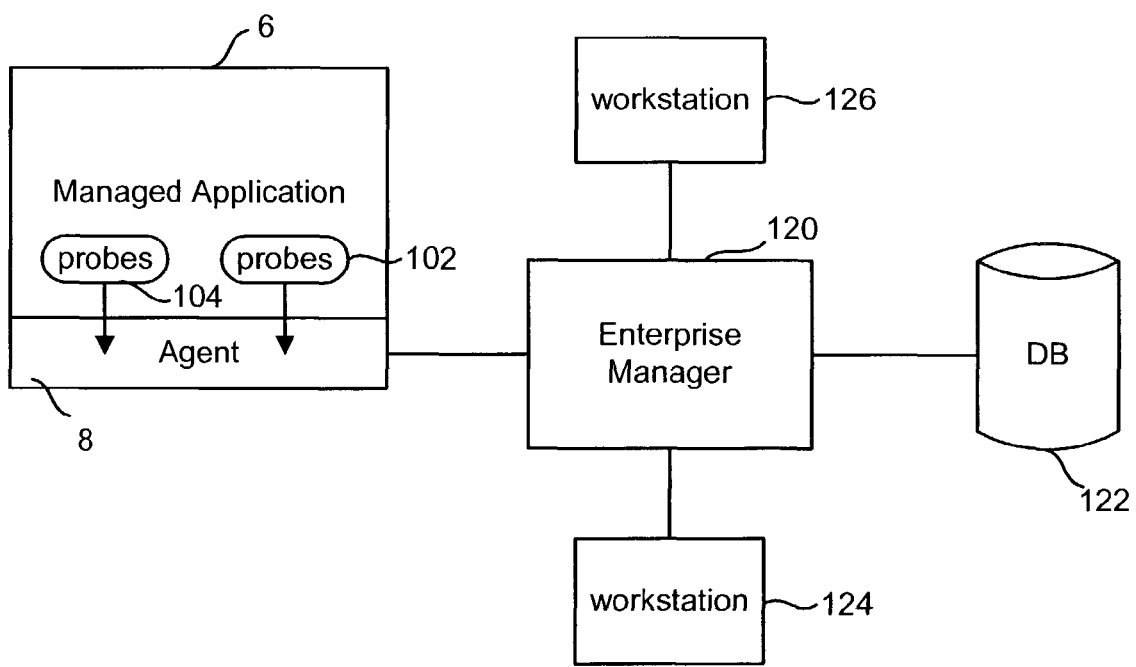
FIG. 2 is a block diagram of a system for monitoring an application. This system represents one example of a system that can implement the present invention.

FIG. 2 is a conceptual view of the components of one example of an application performance analysis tool. In addition to managed Application 6 with probes 102 and 104, FIG. 2 also depicts Enterprise Manager 120, database 122, workstation 124 and workstation 126. As a managed application runs, probes (e.g. 102 and/or 104) relay data to Agent 8. Agent 8 then collects and summarizes the data, and sends it to Enterprise Manager 120. Enterprise Manager 120 receives performance data from managed applications via Agent 8, runs requested calculations, makes performance data available to workstations (e.g. 124 and 126) and optionally sends performance data to database 122 for later analysis. The workstations (e.g. 124 and 126) are the graphical user interface for viewing performance data. The workstations are used to create custom views of performance data which can be monitored by a human operator. In one embodiment, the workstations consist of two main windows: a console and an explorer. The console displays performance data in a set of customizable views. The explorer depicts alerts and calculators that filter performance data so that the data can be viewed in a meaningful way.

In one embodiment of the system, each of the components is running on different machines. That is, workstation 126 is on a first computing device, workstation 124 is on a second computing device, Enterprise Manager 120 is on a third computing device, managed Application 6 is running on a fourth computing device and Probe Builder 4 is running on a fifth computing device. In another embodiment, two or more of the components are operating on the same computing device. For example, managed application 6 and Agent 8 may be on a first computing device, Enterprise Manager 120 on a second computing device and a workstation on a third computing device. Alternatively, all of the components can run on the same computing device. Any or all of these computing devices can be any of various different types of computing devices, including personal computers, minicomputers, mainframes, servers, handheld computing devices, mobile computing devices, etc. Typically, these computing devices will include one or more processors in communication with one or more processor readable storage devices, communication interfaces, peripheral devices, etc. Examples of the storage devices include RAM, ROM, hard disk drives, floppy disk drives, CD ROMS, DVDs, flash memory, etc. Examples of peripherals include printers, monitors, keyboards, pointing devices, etc. Examples of communication interfaces include network cards, modems, wireless transmitters/receivers, etc. The system running the managed application can include a web server/application server. The system running the managed application may also be part of a network, including a LAN, a WAN, the Internet, etc. In some embodiments, all or part of the invention is implemented in software that is stored on one or more processor readable storage devices and is used to program one or more processors.

Figure 3:
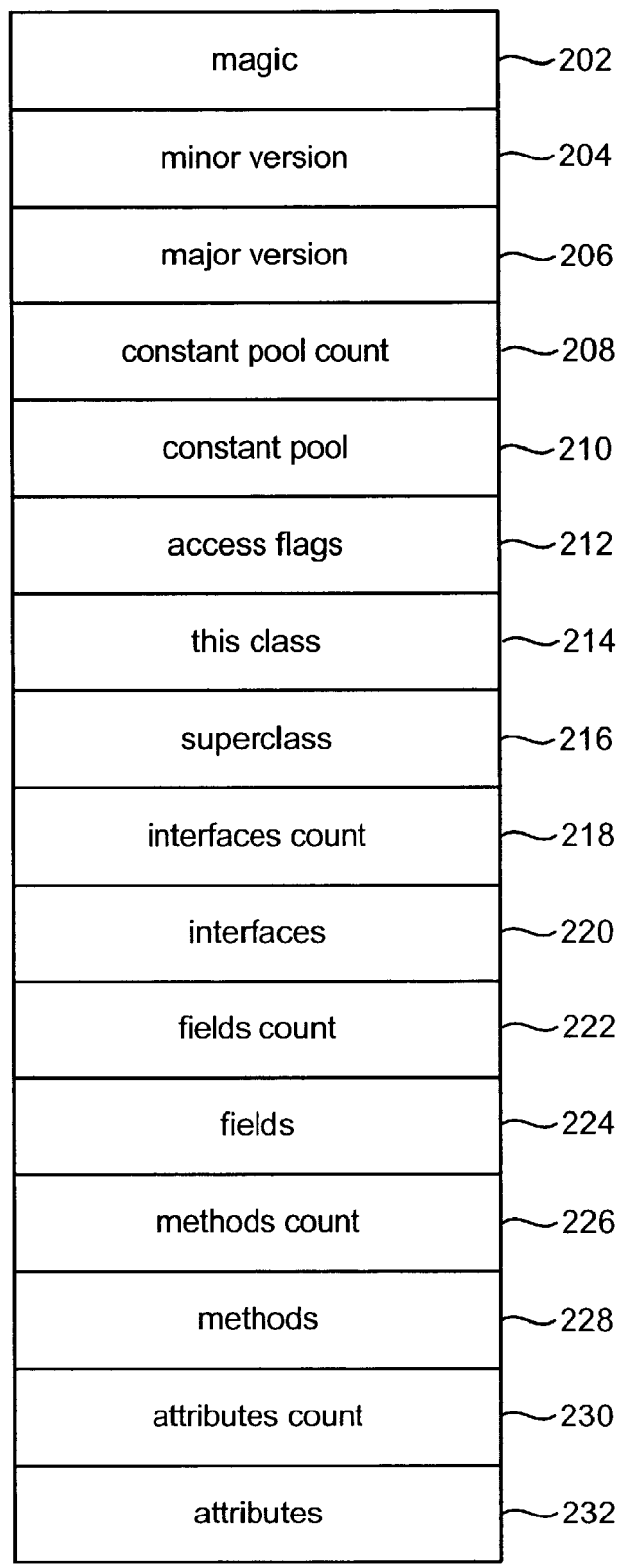
FIG. 3 depicts a symbolic representation of a class data structure.

In one embodiment, the object code that is being modified is stored in a class data structure according to the JAVA Virtual Machine Specification. FIG. 3 is a symbolic representation of the class data structure which holds the code for a class. The term code is used to refer to all of the instructions, variables, definitions, pointers, addresses etc, that are stored in a class file and/or a class data structure. Magic item 202 supplies the magic number identifying the class file. The values of minor version 204 and major version 206 are the minor and major version numbers of the compiler that produced the class file. Constant pool count item 208 provides the number of entries in the constant pool. Constant pool 210 is a table of variable length structures representing various string constants, class names, field names, integers, floating point numbers and other constants that are referred to within the class file structure and its substructures. The value of access flags item 212 is a mask of modifiers used with class and interface declarations. The access flags modifiers are public, final, super, interface and abstract. The value of this class item 214 must be a valid index into the constant pool table. The constant pool entry at that index must be a structure representing the class or interface defined by this class file. For a class, the value of superclass item 216 either must be zero or must be a valid index into the constant pool. If the value of the superclass item is nonzero, the constant pool entry at that index must be a structure representing the superclass of the class defined by this class file.

The value of interfaces count item 218 provides the number of direct superinterfaces of this class or interface type. The value of the fields count item 222 provides the number of field_info structures in the fields table 224. The field_info structures represent all fields, both class variables and instance variables, declared by this class or interface type. Each value in the fields must be a variable-length field_info structure, giving a complete description of a field in the class, or interface type. The fields table includes only those fields that are declared by this class or interface. It does not include item fields that are inherited from superclasses or superinterfaces.

The value of methods count item 226 provides the number of method_info structures in methods table 228. Each entry in methods table 228 must be a variable-length method_info structure providing a complete description of the JAVA Virtual Machine code for a method in the class or interface. The method_info structures represent all methods, both instance methods and, for classes, class (static) methods, declared by this class or interface type.

The value of the attributes count item 230 provides the number of attributes in attributes table 232. Each entry in attributes table 232 must be a variable-length attribute structure. A class data structure can have any number of attributes associated with it. More information about ClassFile formats and the JAVA Virtual Machine can be found in The JAVA Virtual Machine Specification, Tim Lindholm and Frank Yellin, Addison-Wesley, 1997, incorporated herein by reference.

Each method in methods table 228 is described by a variable-length method_info structure. The structure has the following format:

```
method_info {
    u2 access_flags;
    u2 name_index;
    u2 descriptor_index;
    u2 attributes_count;
    attribute_info attributes
        [attributes_count];
}
```

The value of the access_flags item is a mask of modifiers used to describe access permission to and properties of a method. The access_flags modifiers are public, private, protected, static, final, synchronized, native, abstract and strict. The value of the name_index item must be a valid index into the constant pool. The constant pool entry at that index is a valid JAVA method name. The value of the descriptor_index item must be a valid index into the constant pool representing a valid JAVA method descriptor. The value of the attributes_count item indicates the number of additional attributes of this method. Each value of the attributes table must be a variable-length attribute structure. A method can have code attributes and exception attributes.

The Code attribute is a variable-length attribute used in the attributes table of method_info structures. A Code attribute contains the JAVA virtual machine instructions for a single JAVA method, instance initialization method or class interface initialization method.

The Code attribute has the following format:

```
Code_attribute {
    u2 attribute_name_index;
    u4 attribute_length;
    u2 max_stack;
    u2 max_locals;
    u4 code_length;
    u1 code[code_length];
    u2 exeption_table_length;
    {   u2 start_pc;
        u2 end_pc;
        u2 handler_pc;
        u2 catch_type;
    } exception_table
    [exception_table_length];
    u2 attributes_count;
    attribute_info attributes
    [attributes_count];
```

The attribute_name_index must be a valid index into the constant pool table. The constant pool entry at the index represents the string "Code." The value of the attribute_length item indicates the length of the attribute, excluding the initial six bytes. The value of the max_stack item gives the maximum number of words on the operand stack at any point during execution of this method. The value of the max_locals item gives the number of local variables used by this method, including the parameters passed to the method on invocation. The value of the code_length item gives the number of bytes in the code array for this method. The code array stores the actual bytes of code that implement the method. The exception_table_length provides the number of entries in the exception_table.

Each entry in the exception_table array describes one exception handler in the code array. Each exception_table entry contains the following items: start_pc, end_pc, handler_pc and catch_type. The values of start_pc and end_pc indicate the ranges in the code array at which the exception handler is active. The value of start_pc must be a valid index into the code array of the opcode of an instruction. The value of end_pc must be a valid index into the code array of the opcode of an instruction, or must be equal to code_length, the length of the code array. The value of start_pc must be less than the value of end_pc. Start_pc is inclusive and end_pc is exclusive. The value of handler_pc indicates the start of the exception handler code, is a valid index into the code array, is the index of the opcode of an instruction, and is less than the value of code_length. If the value of catch_type is non-zero, then catch_type must be a valid index into the constant pool table. The constant pool entry at that index must be a structure representing a class of exceptions that this exception handler is designed to catch. This class must be the class Throwable or one of its subclasses. The exception handler will be called only if the thrown exception is an instance of the given class or one of its subclasses. If the value of the catch type item is 0, this exception handler is called for all exceptions—this is used to implement "Finally." The value of the attributes_count item indicates the number of attributes in the code attribute. Each value of the attributes table must be a variable-length structure.

The class file structure of FIG. 3 described above is an example of the structure that is modified by Probe Builder 4. Formats and file structures other than that depicted in FIG. 3 can also be used.

Figure 4:
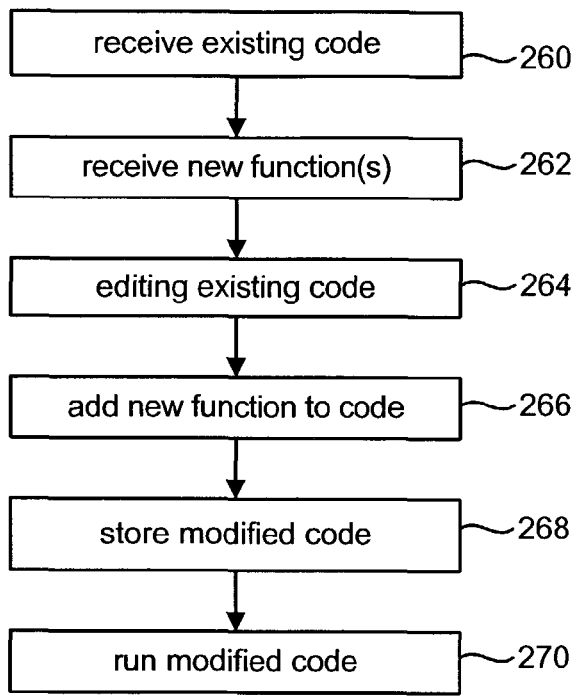
FIG. 4 is a flow chart describing one embodiment of the process of modifying existing object code.

FIG. 4 is a flowchart describing the process of modifying the existing object code in order to add new functionality that accesses return values and exceptions. In step 260, Probe Builder 4 receives the existing object code. In step 262, Probe Builder 4 receives the new functionality, which can be new classes and methods that allow for monitoring the application. In some embodiments, the new classes and methods can be in the form of a library. In step 264, the existing code is edited. In step 266, all or part of the new functionality (e.g. the new classes/methods) is added to, combined with, or associated with the existing code. In step 268, the modified code (which includes the new functionality) is stored. In step 270, the modified code is run. In one embodiment, step 270 includes running the application as depicted in FIG. 2. In embodiments that use environments other than a performance analysis tool, step 270 includes executing in those other environments. The present invention is not limited to use with a performance management tool.

Figure 5:
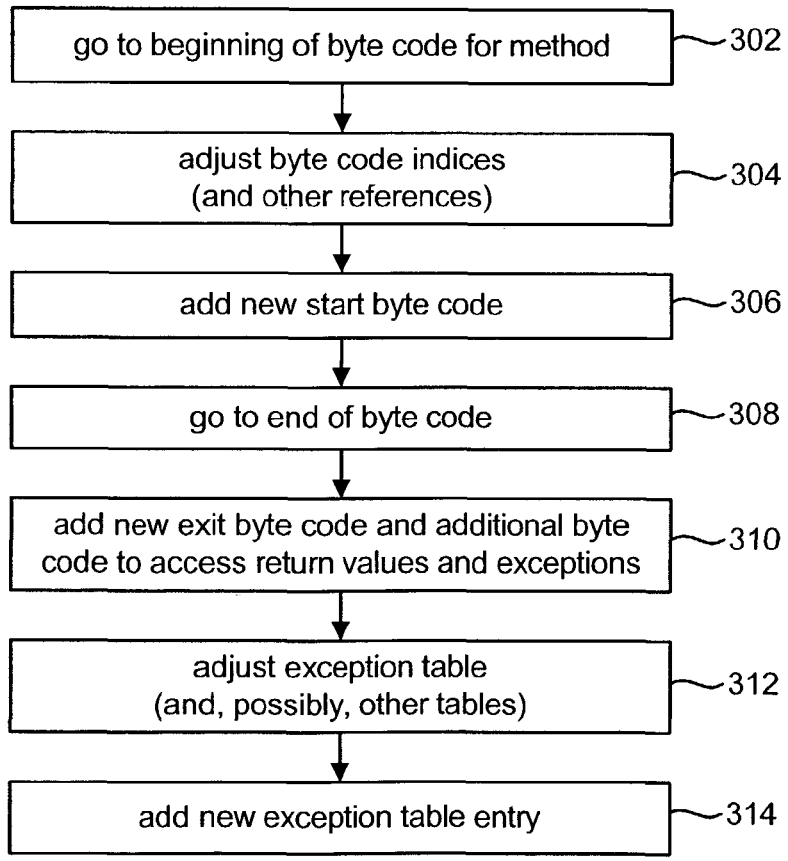
FIG. 5 is a flow chart describing one embodiment of the process of modifying a method.

Step 264 of FIG. 4 includes modifying existing code. That step includes modifying methods in the original application. FIG. 5 depicts one embodiment of a process for modifying a method. The process of FIG. 5 would be repeated for each method that needs to be modified and can be performed on data structures like that of FIG. 3. In other embodiments, the process of FIG. 4 can operate on data structures other than that of FIG. 3.

In step 302 of FIG. 5, the system accesses the beginning of the byte code for a particular method. In one implementation, step 302 includes accessing the first element in the code array of the code_attribute of the method_info structure. In step 304, the indices for the byte code are adjusted. That is, the system knows it needs to add code and knows how many bytes the code occupies. These bytes will be added to the array. Therefore, the remaining instructions need to be moved (change index) to make room for the new instructions. For example, if the start code needs 8 bytes, then the indices for the original code needs to be adjusted to reflect the displacement by 8 bytes. Additionally, all references to byte code within an instruction must also be adjusted; for example, the pointer reference for a jump or branch instruction must be adjusted. In step 306, new start code is added to the code array. An example of start code is code that starts a timer, tracer or other profiling mechanism. Some embodiments do not use start code. In step 308, the system accesses the end of the byte code, which in one embodiment is the end of the code array. In step 310, new exit byte code is added at the end of the code array. An example of exit code is code used to stop a timer, tracer or other profiling mechanism, as well as code to record information and/or perform action at the conclusion of a method. Some embodiments include adding all or a portion of the exit byte code at locations other than the end of the byte code. Step 310 also includes adding additional byte code to the code array that allows the return values and exceptions to be accessed. In step 312 of FIG. 5, the exception table is adjusted. That is, because the indices of the byte codes changed, the values of start_pc, end_pc and handler_pc may need to be changed for existing exception handlers. Step 312 can also include adjusting other tables in the class file, as appropriate to the particular implementation. In step 314, a new entry is added to the exception table. This new entry correlates to the new AFinally@ block. The new entry has a catch_type of zero, indicating it is for all exceptions. Additionally, the new entry in the exceptions table will be added to the end of the exceptions table. The start_pc and end_pc of the new entry are set to include the original JAVA instructions for the method being modified. The value of the handler_pc for the new entry would point to the new byte code added in step 310.

Figure 6:
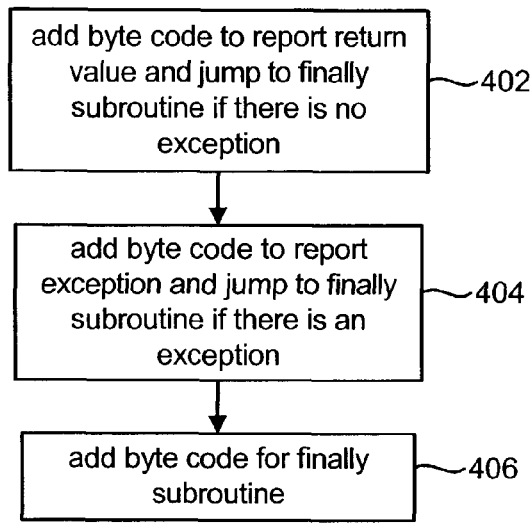
FIG. 6 is a flow chart describing one embodiment of the process of adding new exit byte code.

FIG. 6 is a flowchart describing more detail of the process of adding new exit byte code and the additional byte code for accessing return values and exceptions (step 310 of FIG. 5). In step 402, new code is added to the code array to account for the situation where there is no exception. That is, the original JAVA method instructions are performed without any exceptions. After the original instructions are performed, the "Finally" block should be executed. The original code is modified to include a jump to the byte code subroutine for the AFinally@ block. Additionally, new byte code is added to access the return value and pass that return value to an object (or other structure, process, entity, etc.) for storage, statistical or other purposes.

In step 404, new byte code is added to the code array that accounts for the situation when there are exceptions. This step includes adding byte code to existing exception handlers and, in some embodiments, adding one or more additional exception handlers. The exception handlers will be provided with byte code that includes a jump to the byte code subroutine for the "Finally" block. Additionally, new byte code is added to access the exception and pass that exception to an object (or other structure, process, entity, etc.) for storage, statistical or other purposes. In step 406, the byte code for the "Finally" block is added.

To better understand the present invention, an example is provided. This example explains one embodiment for adding functionality to code in order to access return values and exceptions. Described above is example pseudo code for "exampleMethod." Below is the pseudo object code (converted to a human readable form) for exampleMethod:

0 iload_1
1 iconst_1
2 iadd
3 ireturn

The pseudo object code for exampleMethod includes four instructions. The first instruction (iload_1) pushes the parameter x onto the operand stack. The second instruction (iconst_1) pushes a constant (1) onto the operand stack; The third instruction (iadd) adds the top two quantities on the operand stack. The fourth instruction returns whatever is on top of the operand stack, which in this case is the sum from the previous instruction. The code above is an example of the existing object code that would be an input to Probe Builder 4. In one example, Probe Builder 4 modifies this existing object code to be as follows:

0 ldc #42 <String "com.wily.introscope.agent.trace.MethodTimer">
2 aload_0
3 ldc #56 <String "com.wily.example.ExampleApp">
5 ldc #58 <String "exampleMethod">
7 ldc #60 <String "name=Example Stat">
9 invokestatic #48 <Method
com.wily.introscope.agent.trace.IMethodTracer
com.wily.introscope.agent.trace.AMethodTracer.loadTracer(java.lang.String, java.lang.Object, java.lang.String, java.lang.String, java.lang.String)>
12 astore 4
14 nop
15 nop
16 iload_1
17 iconst_1
18 iadd
19 istore 5
21 aload 7

23 iload 5
25 invokeinterface NoticeReturnValueMethod
30 iload 5
32 jsr 60
35 iload 5
37 nop
38 ireturn
40 astore 9
42 aload 11
44 aload 9
46 invokeinterface NoticeExceptionMethod
51 aload 9
53 jsr 60
56 aload 9
57 athrow
58 nop
59 nop
60 astore_2
61 aload 4
63 invokeinterface (args 1) #54
    <InterfaceMethod void IMethodTracer_finishTrace( )>
68 ret 2
70 nop
71 nop

| Exception Table | | | |
|---|---|---|---|
| start_pc | end_pc | handler_pc | catch_type |
| 16 | 40 | 40 | 0 |

Probe Builder 4 modified the original object code to add start code, exit code, code to access a return value and code to access an exception. The first section of the modified code, identified by lines (indices to the code array) 0-15, corresponds to the source code "IMethodTracer tracer=AMethodTracer.loadTracer( . . . parameter . . . )" This byte code pushes the parameters, calls AMethodTracer-.loadTracer, and stores the result in a local variable. The nops at the end are just to make coding easier. In one embodiment, the longest sequence needed to generate is 16 bytes long. In one implementation, the code modifier always adds 16 bytes. Sometimes not all 16 bytes are used, so the code is padded with nops. The code in the first section, described above, is added as part of step 306 of FIG. 5.

The second section of the modified code corresponds to instructions at lines 16, 17 and 18. These three instructions correspond to existing object code for implementing "x=x+ 1."

The third section of the modified code corresponds to instructions at lines 19-38, and is performed in the case where there are no exceptions. This code is added as part of step 402 of FIG. 6. The code of the third section locally stores the return value, prepares the operand stack for a method invocation, invokes the method that will use the return value and resets the operand stack with respect to the return value. For example, at line 19, the return value (which is on the top of the operand stack) is stored into the local variable array (at location 5) of the current frame. At line 21, the value at location 7 of the local variable array is loaded on the top of the operand stack. This value is an object reference. At line 23, the return value is loaded from local variable array to the top of the operand stack. At line 25, an interface method is invoked. This interface method is the method that will receive the return value and do something with it (discussed below). This inter-face method was added to the application as part of step 266 of FIG. 4. The code above uses "NoticeReturnValueMethod" to represent the index to the constant pool for the method. The operand stack will include a reference to an object whose class (or super class) declares the interface method. The operand stack will also include the return value which is passed as an argument to the interface method. After the interface method is invoked, the return value is loaded back on the operand stack (line 30—iload 5)) and the code jumps to the subroutine for the "Finally" block (line 32—jsr 60). When the code returns from the subroutine for the "Finally" block, the return value is loaded back on the operand stack (line 35—iload 5) and the method returns back to that which invoked it.

Note that the code uses the instructions "istore" and "iload" with regard to the return value because the return value is an integer. If the return value was a different type of variable, the appropriate instructions for those variable types would be used (e.g. astore, fstore, dstore, etc. and aload, fload, dload, etc.)

The fourth section includes the code at lines 40-59. This code is added as part of step 404 of FIG. 6 and is the Acatch all" exceptions handler. Any exceptions not otherwise handled would jump to this code. The code of the fourth section locally stores the exception, prepares the operand stack for a method invocation, invokes the method that will use the exception, resets the operand stack with respect to the exception and throws the exception. If the exception handler was specific to a particular type of exception object, then it might deal with the exception rather than or in addition to throwing the exception. At line 40, the reference to the exception (which is on top of the operand stack) is stored in the local variable array. At line 42, the value at location 11 of the local variable array is loaded on the top of the operand stack. This value is an object reference. At line 44, the reference to the exception is added back to the operand stack. At line 46, an interface method is invoked. This interface method is the method that will receive the reference to the exception and do something with it (discussed below). The code above uses "NoticeExceptionMethod" to represent the index to the constant pool for the method. The operand stack will include a reference to an object whose class (or super class) declares the interface method. The operand stack will also include the reference to the exception, which is passed as an argument to the interface method. After the interface method is invoked the reference to the exception is loaded back on the operand stack (line 51—aload 3) and the code jumps to the subroutine for the "Finally" block (line 53—jsr 60). When the code returns from the subroutine for the "Finally" block, the method throws the exception.

The fourth section of the code discussed above includes instructions for a Acatch all" exceptions handler. The existing object code may also include other exception handlers, for example, using a "catch" statement or other suitable code for a specific type of exception. In some embodiments, these other exception handlers will be modified as described above to include the code for invoking the interface method. For example, code similar to the instructions at lines 40-51 above could be added to other exception handlers.

The fifth section includes the code at line 60-71, represents the "Finally" handler itself and is added as part of step 406 of FIG. 6. This code stores its own return address, loads the tracer out of local variable array index 4 (where it put it back at line 12), calls the finish trace handler, and returns back to where it came from.

The example above also includes an exception table which has one entry. This entry indicates that for code between indices 16 and 40, if there is any type of exception go to the handler starting at line 40.

Figure 7:
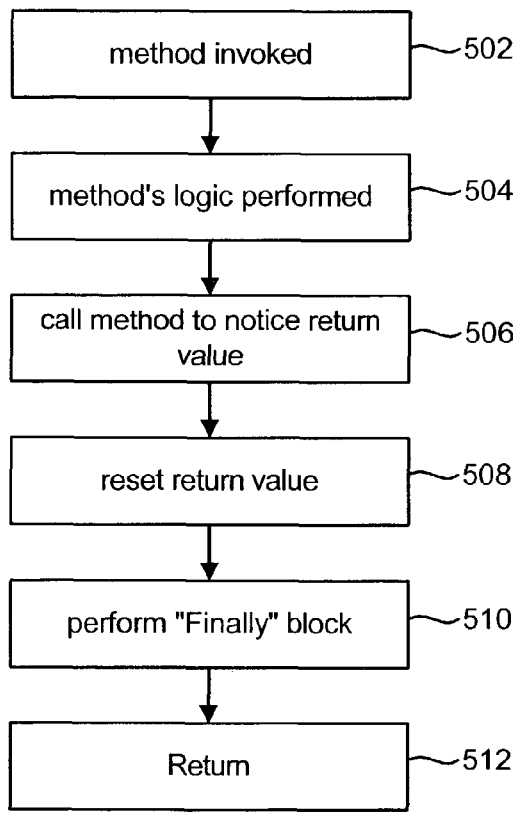
FIG. 7 is a flow chart describing one embodiment of the process performed when operating code modified according to the present invention.

FIG. 7 is a flow chart describing one embodiment of the process performed when operating code modified according to the present invention. In step 502, a method that has been modified as explained above, is invoked. In step 504, the code for the invoked method is performed and a return value is generated. In the example above regarding "exampleMethod," the parameter passed into the method is incremented by one. In step 506, the method that will accept and use the return value is invoked and passed the return value. For example, step 506 includes the "invokeinterface NoticeReturnValueMethod" instruction described above. Prior to invoking the method, the return value is stored and the operand stack is manipulated as described above. This invoked method can use the return value for any number of applications. For example, al (or a subset) of the return values can be stored (temporary or persistently), displayed, printed etc., for use by a person, process or other entity that is debugging the system, monitoring system performance, monitoring for errors, generating statistics about the method providing the return values, etc. In one embodiment, the return value is stored and subsequently used by a method that is in a different thread then the method that was invoked in step 502 and generated the return value. In one embodiment, return values are stored in a data structure. If there are no errors, the return values are deleted. If there is an error, the return values are stored for future access or are reported to a person, process or other entity.

In step 508, the return value is reset on the stack so that the operand stack, with respect to the return value, is in the same state as if the code had not been modified to add the ability to access the return value. In step 510, the "Finally" block is performed. In step 512, the return value is provided to the entity that invoked the method in step 502.

Figure 8:
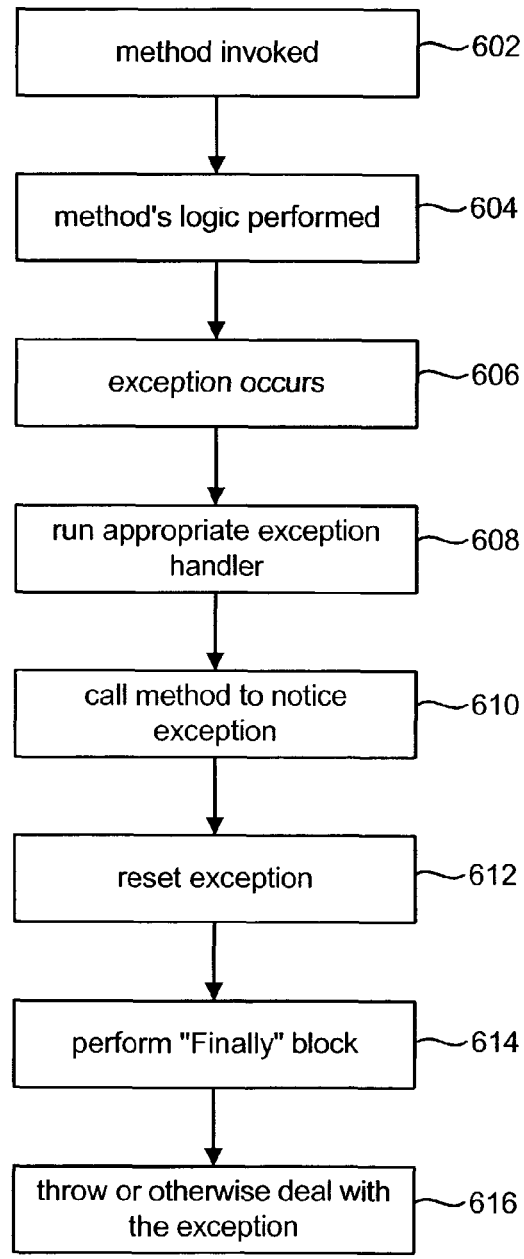
FIG. 8 is a flow chart describing one embodiment of the process performed when operating code modified according to the present invention and an exception occurs.

FIG. 8 is a flow chart describing one embodiment of the process performed when operating code modified according to the present invention and an exception occurs. In step 602, a method that has been modified (as explained above) is invoked. In step 604, the code for the invoked method is performed. In step 606, an exception occurs. In step 608, an appropriate exception handler is performed. For example, if there is a specific exception handler for the type of exception object created, then that specific exception handler will be run. Otherwise, a catch-all exception handler can be run. From within the exception handler that is run (or from somewhere else appropriate) the method that will accept and use the exception is invoked and passed the reference to the exception. For example, step 610 includes the "invokeinterface NoticeExceptionMethod" instruction described above. Prior to invoking this method, the reference to the exception is stored and the operand stack is manipulated as described above. This invoked method can use the exception for any number of applications. For example, all (or a subset) of the exceptions can be stored, have their information displayed, have their information printed etc., for use by a person, process or other entity that is debugging the system, monitoring system performance, monitoring for errors, generating statistics the system, etc. In step 612, the reference to the exception is reset on the stack so that the operand stack, with respect to the exception, is in the same state as if the code had not been modified to add the ability to access the exception. In step 614, the "Finally" block is performed. In step 616, the exception is thrown or otherwise dealt with by the exception handler.

In the above examples, it is assumed that Probe Builder 4 (or another suitable means) is used to add Try-Finally functionality, code to access return values and code to access exceptions. In some embodiments, the original code may already include Try-Finally functionality; therefore, Probe Builder 4 (or another suitable means) can be used to add code to access return values and exceptions without needing to add Try-Finally functionality. In some instances, Probe Builder 4 may need to modify the Try-Finally functionality in order to add code to access return values and exceptions. In other embodiments, code to access return values and/or exceptions can be added to code not having "Try" and "Finally" functionality. Furthermore, the above examples add a tracer to the existing object code; however, the present invention can be used with or without tracers.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for adding functionality in order to access information, comprising:

accessing existing object code of a first application, said existing object code includes a first method, said first method produces a result when said first method is executed, said existing object code is not configured to provide access to said result by an additional method for which such access is desired;

editing said existing object code to provide modified object code which provides access to said result by said additional method when said first method is executed; and executing said modified object codes;

said editing comprises modifying said existing object code for:

storing said result, said result is from an operand stack:

preparing said operand stack for an invocation of said additional method;

invoking said additional method, including providing said result to said additional method; and resetting said operand stack with respect to said result to a state existing prior to said step of storing said result.

2. A method according to claim 1, wherein:

said result includes a data item to be returned by said first method.

3. A method according to claim 1, wherein:

said result includes a reference to an exception.

4. A method according to claim 1, wherein said step of editing includes:

adding code that jumps to a subroutine representing a Finally block after invoking said additional method; and adding code that is to be executed after returning from said subroutine.

5. A method according to claim 1, wherein said step of editing includes:

adding start byte code;

adjusting byte code indices;

adding exit byte code; and modifying an exception table for said first method.

6. A method according to claim 5, wherein said step of adding exit byte code includes:
adding byte code to report said result and jump to a subroutine representing a Finally block;
adding byte code to report an exception and jump to said subroutine representing said Finally block; and
adding byte code for said subroutine representing said Finally block.

7. A method according to claim 1, wherein said step of editing includes:
adding Try-Finally functionality which is not included in said existing object code.

8. A method according to claim 1, wherein:
said result includes a data item to be returned by said first method.

9. A method according to claim 8, further comprising:
returning said result after said step of resetting.

10. A method according to claim 1, wherein:
said result includes a reference to an exception.

11. A method according to claim 10, further comprising:
throwing said exception after said step of resetting.

12. A method according to claim 1, further comprising:
performing said additional method in response to said step of invoking.

13. A method according to claim 1, further comprising:
performing one or more instructions of said first method prior to said step of storing said result, said step of performing one or more instructions includes generating said result.

14. A method according to claim 1, in, further comprising:
returning said result subsequent to said step of resetting;
jumping to a subroutine representing a Finally block after invoking said additional method and prior to returning said result; and
returning from said subroutine prior to returning said result.

15. A method according to claim 1, wherein
said modified object code comprises byte code which performs said steps of storing, preparing, invoking and resetting.

16. A method according to claim 15, wherein said step of editing includes:
adding start byte code;
adjusting byte code indices;
adding exit byte code; and
modifying an exception table for said first method.

17. A method according to claim 16, wherein said step of adding exit byte code includes:
adding byte code to report said result and jump to a subroutine representing a Finally block;
adding byte code to report an exception and jump to said subroutine representing said Finally block; and
adding byte code for said subroutine representing said Finally block.

18. A method according to claim 15, wherein said step of editing includes:
adding Try-Finally functionality which is not included in byte code for said first method which is modified.

19. A method according to claim 1, further comprising:
performing said additional method, including accessing said result.

20. A method according to claim 1, further comprising:
performing said additional method, including storing said result for use outside of a thread that includes said first method.

21. A method according to claim 1, further comprising:
performing said additional method in response to said step of invoking, said additional method stores said result;
performing one or more instructions of said first method prior to said step of storing said result, said step of performing one or more instructions includes generating said result; and
modifying byte code for said first method to perform said steps of storing, preparing, invoking and resetting.

22. A method according to claim 21, further comprising:
returning said result;
jumping to a subroutine representing a Finally block after invoking said additional method and prior to returning said result; and
returning from said subroutine prior to returning said result.

23. A method according to claim 1, wherein:
said step of editing includes providing a tracer for said first method.

24. A method according to claim 1, wherein:
said step of editing includes providing a timer for said first method.

25. A method according to claim 1, wherein:
said existing object code is object code of an application to be monitored; and
said additional method is part of a monitoring program which monitors execution of said application.

26. A method according to claim 1, wherein:
said existing object code is object code of an application; and
said additional method is part of said application.

27. A method according to claim 1, wherein:
said modified object code is provided without recompiling said existing object code.

28. One or more processor readable storage devices having processor readable code embodied on said processor readable storage devices, said processor readable code for programming one or more processors to perform a method comprising:
accessing existing object code, said existing object code includes a first method, said first method produces a result when said first method is executed, said existing object code is not configured to provide access to said result by an additional method for which such access is desired; and
modifying said existing object code to provide modified object code that, when executed, provides said result to said additional method;
said step of modifying includes:
adding code that stores said result for said first method from an operand stack;
adding code that prepares said operand stack for an invocation of said additional method;
adding code that invokes said additional method, including providing said result to said additional method; and
adding code that resets said operand stack with respect to said result to a state existing prior to storing said result.

29. One or more processor readable storage devices according to claim 28, wherein:
said result is a data item to be returned by said first method.

30. One or more processor readable storage devices according to claim 28, wherein:
said result is a reference to an exception.

31. One or more processor readable storage devices according to claim 28, wherein said step of modifying includes:
  adding start byte code;
  adjusting byte code indices;
  adding exit byte code; and
  modifying an exception table for said first method.

32. One or more processor readable storage devices according to claim 31, wherein said step of adding exit byte code includes:
  adding byte code to report said result and jump to a subroutine representing a Finally block;
  adding byte code to report an exception and jump to said subroutine representing said Finally block; and
  adding byte code for said subroutine representing said Finally block.

33. An apparatus that adds functionality in order to access information, comprising:
  a communication interface;
  a processor readable storage device; and
  one or more processors in communication with said processor readable storage device and said communication interface, said one or more processors perform a method comprising:
    access existing object code, said existing object code includes a first method, said first method produces a result when said first method is executed, said existing object code is not configured to provide access to said result by an additional method for which such access is desired; and
    modifying said existing object code to provide modified object code that, when executed, provides said result to said additional method;
    said step of modifying includes:
      adding code that stores said result for said first method from an operand stack;
      adding code that prepares said operand stack for an invocation of said additional method;
      adding code that invokes said additional method including providing said result to said additional method; and
      adding code that resets said operand stack with respect to said result to a state existing prior to storing said result.

34. An apparatus according to claim 33, wherein:
  said result is a return value or a reference to an exception.

35. An apparatus according to claim 33, wherein said step of modifying includes:
  adding start byte code;
  adjusting byte code indices;
  adding exit byte code; and
  modifying an exception table for said first method.

36. An apparatus according to claim 35, wherein said step of adding exit byte code includes:
  adding byte code to report said result and jump to a subroutine representing a Finally block;
  adding byte code to report an exception and jump to said subroutine representing said Finally block; and
  adding byte code for said subroutine representing said Finally block.

37. An apparatus that adds functionality to existing code in order to access information, comprising:
  a communication interface;
  a processor readable storage device; and
  one or more processors in communication with said processor readable storage device and said communication interface, said one or more processors perform a method for modifying byte code for a first method, said byte code is not configured to provide a result to a second method when said second method is invoked, said method comprising:
    storing a result for said first method from an operand stack,
    preparing said operand stack for an invocation of said second method,
    invoking said second method, including providing said result to said second method, and
    resetting said operand stack with respect to said result to a state existing prior to said step of storing said result.

38. An apparatus according to claim 37, wherein:
  said result is a data item to be returned by said first method or a reference to an exception.

39. An apparatus according to claim 37, wherein said step of modifying includes the steps of:
  adding start byte code;
  adjusting byte code indices;
  adding exit byte code; and
  modifying an exception table for said first method.

40. An apparatus according to claim 39, wherein said step of adding exit byte code includes:
  adding byte code to report said result and jump to a subroutine representing a Finally block;
  adding byte code to report an exception and jump to said subroutine representing said Finally block; and
  adding byte code for said subroutine representing said Finally block.

* * * * *

UNITED STATES PATENT AND TRADEMARK OFFICE
CERTIFICATE OF CORRECTION

PATENT NO. : 7,496,896 B2  Page 1 of 1
APPLICATION NO. : 10/622022
DATED : February 24, 2009
INVENTOR(S) : Bley It is certified that error appears in the above-identified patent and that said Letters Patent is hereby corrected as shown below:

Col. 14, line 40: after "object" and before "said" delete "codes;" and substitute therefore --code;--

Signed and Sealed this

Fourteenth Day of July, 2009

JOHN DOLL
*Acting Director of the United States Patent and Trademark Office*